(12) United States Patent
Ma (10) Patent No.: US 9,560,834 B2
(45) Date of Patent: Feb. 7, 2017

(54) AUTOMATIC PET FEEDER HAVING ROTATING FOOD HOPPER AND FOOD LEAKING PLATE

(71) Applicant: TONGFU MANUFACTURING CO., LTD., Nanjing, Jiangsu Province (CN)

(72) Inventor: Yaomin Ma, Nanjing (CN)

(73) Assignee: TONGFU MANUFACTURING CO., LTD., Nanjing (CN)

( * ) Notice: Subject to any disclaimer, the term of this patent is extended or adjusted under 35 U.S.C. 154(b) by 0 days.

(21) Appl. No.: 14/624,965

(22) Filed: Feb. 18, 2015

(65) Prior Publication Data
US 2016/0007564 A1    Jan. 14, 2016

(30) Foreign Application Priority Data

Jul. 14, 2014  (CN) .......................... 2014 1 0332859

(51) Int. Cl.
*A01K 5/02*    (2006.01)
*A01K 5/01*    (2006.01)
(52) U.S. Cl.
CPC ........... *A01K 5/0225* (2013.01); *A01K 5/0114* (2013.01); *A01K 5/02* (2013.01)
(58) Field of Classification Search
CPC .......... A01K 5/00; A01K 5/02; A01K 5/0114; A01K 5/0135; A01K 5/0216; A01K 5/0225; A01K 5/0275; A01K 5/0291
See application file for complete search history.

(56) References Cited

U.S. PATENT DOCUMENTS

| 2,500,243 | A | * | 3/1950 | Dixon | A01K 5/0291 |
| | | | | | 119/51.13 |
| 2,528,742 | A | * | 11/1950 | Coffing | A01K 5/0114 |
| | | | | | 119/51.12 |
| 3,050,029 | A | * | 8/1962 | Appleton | A01K 61/025 |
| | | | | | 119/51.11 |
| 3,468,291 | A | * | 9/1969 | Allen | A01K 1/0356 |
| | | | | | 119/51.12 |
| 3,826,231 | A | * | 7/1974 | Crawford | A01K 5/0291 |
| | | | | | 119/51.12 |
| 4,249,483 | A | * | 2/1981 | Sobky | A01K 5/0291 |
| | | | | | 119/51.12 |

(Continued)

FOREIGN PATENT DOCUMENTS

| CN | 2698068 Y | 5/2005 |
| CN | 201067026 Y | 6/2008 |

(Continued)

OTHER PUBLICATIONS

Nov. 15, 2014 Search Report issued in Chinese Patent Application No. 201410332859.2.

*Primary Examiner* — Monica Williams
*Assistant Examiner* — Michael A Fabula
(74) *Attorney, Agent, or Firm* — Oliff PLC (57) ABSTRACT

An automatic pet feeder includes a food hopper and a feeding tray; the hopper has a bottom larger than a top and includes a cylindrical rotating shaft located in the center, and a tapered outer wall. A grid is fixed between an outer side surface of the rotating shaft and the food leaking outer wall, and the grid is radial with the axis of the rotating shaft as the center of a circle, to partition a space between the outer side surface of the rotating shaft and the food leaking outer wall into feeding spaces with the same size.

13 Claims, 7 Drawing Sheets

(56) References Cited

U.S. PATENT DOCUMENTS

| | | | | |
|---|---|---|---|---|
| 4,421,059 A * | 12/1983 | Cousino | A01K 5/0291 | 119/51.12 |
| 4,450,790 A * | 5/1984 | Stansbury, Jr. | A01K 5/0291 | 119/51.12 |
| 4,485,765 A * | 12/1984 | Schwartz | A01K 5/0291 | 119/51.13 |
| 4,492,183 A * | 1/1985 | Chiotasso | A01K 5/0291 | 119/51.13 |
| 4,501,229 A * | 2/1985 | Williamson | A01K 5/0291 | 119/51.12 |
| 4,617,874 A * | 10/1986 | Zammarano | A01K 5/0291 | 119/51.12 |
| 4,671,210 A * | 6/1987 | Robinson | A01K 5/0291 | 119/51.12 |
| 4,805,560 A * | 2/1989 | Knego | A01K 5/0291 | 119/51.12 |
| 4,981,106 A * | 1/1991 | Nagatomo | A01K 5/0275 | 119/51.11 |
| 5,078,097 A * | 1/1992 | Chisholm | A01K 5/0291 | 119/51.11 |
| 5,133,292 A * | 7/1992 | Kirk | A01K 61/025 | 119/51.04 |
| 5,150,664 A * | 9/1992 | Kirk | A01K 5/0291 | 119/51.12 |
| 5,176,103 A * | 1/1993 | Reid | A01K 5/0291 | 119/51.13 |
| 5,222,461 A * | 6/1993 | Haynes | A01K 5/0233 | 119/51.12 |
| 5,377,620 A * | 1/1995 | Phillippi | A01K 5/0291 | 119/51.12 |
| 5,975,021 A | 11/1999 | Shingleton et al. | | |
| 6,427,628 B1 * | 8/2002 | Reece | A01K 5/0291 | 119/51.11 |
| 6,766,766 B1 * | 7/2004 | Elliott | A01K 5/0291 | 119/51.12 |
| 7,793,796 B1 * | 9/2010 | Evans | A45D 8/00 | 221/113 |
| 7,823,538 B1 * | 11/2010 | Merager | A01K 7/02 | 119/72 |
| 8,800,488 B2 * | 8/2014 | Stone | A01K 5/0114 | 119/51.01 |
| 2005/0066905 A1 * | 3/2005 | Morosin | A01K 5/0291 | 119/51.02 |
| 2005/0252457 A1 * | 11/2005 | Morosin | A01K 5/0291 | 119/51.13 |
| 2008/0289580 A1 * | 11/2008 | Krishnamurthy | A01K 5/0291 | 119/51.11 |
| 2012/0060761 A1 * | 3/2012 | Laro | A01K 5/0291 | 119/51.11 |
| 2014/0060441 A1 * | 3/2014 | Baxter | A01K 5/0291 | 119/61.5 |
| 2015/0373945 A1 * | 12/2015 | Sung | A01K 5/0283 | 119/51.5 |

FOREIGN PATENT DOCUMENTS

| | | |
|---|---|---|
| CN | 201252765 Y | 6/2009 |
| CN | 201355984 Y | 12/2009 |
| CN | 201563474 U | 9/2010 |
| JP | 3149260 U | 3/2009 |

* cited by examiner

AUTOMATIC PET FEEDER HAVING ROTATING FOOD HOPPER AND FOOD LEAKING PLATE

BACKGROUND

Technical Field

The present invention relates to pet supplies, and particularly to an automatic pet feeder.

Related Art

An automatic pet feeder, especially a programmable automatic pet feeder, is mainly a device used for providing food for pets regularly and quantitatively according to a program under conditions where the pets cannot be monitored by humans (for example, on business or travel). By means of the device, the pets can acquire a suitable amount of food on time to ensure health. A more advanced automatic feeder can accommodate more food, so as to provide longer-time automatic feeding; and can also implement everyday single or multiple feeding and adjustment on the amount of feeding for each meal through program control.

For example, in terms of a commercially available automatic feeder, an upper portion thereof has a container in the shape of an inverted cone (i.e., big end up), and the container can accommodate 2-4 kg of dog food. The bottom of the inverted cone is connected to a food leaking mechanism. The mechanism consists of a cylinder and several groups of blades evenly distributed on an upper surface of the cylinder. Each group of blades equally divide the circumference of the cylinder therebetween. The mechanism is externally encircled by a cylinder to form a relatively closed space; in this way, the blade groups equally divide a space formed by the inner and outer cylinders, thereby implementing quantification. An upper end of the outer cylinder is connected to the container in the shape of an inverted cone, to allow that food can fall into a space formed by two groups of blades and the two cylinders by means of its own gravity. A lower end of the outer cylinder is connected to a slope, to allow the food to flow out. When the food leaking mechanism operates according to a preset program, a motor drives the cylinder with the blades to rotate, and the food can flow from an upper food container to a lower food bowl. Such a technical solution is a solution which is relatively simple and more popular but is prone to get stuck. When the food reaches the bottom of the container in the shape of an inverted cone, it is easy to form a stable structure, i.e., a stuck state, due to interaction of gravity and friction between the food, and it is more prone to get stuck especially when the food is irregular in appearance or bigger in particle size. When the blades on the inner cylinder rotate, in order to overcome pressure and friction caused by upper food, it is also prone to get stuck. In addition, hard blades may get stuck because the food is clamped, and in order to solve the problem, when the blades are made of a soft material, there is a possibility that the space between the blade groups changes significantly, but the problem of inaccurate feeding quantity arises.

As stated above, lots of users of the automatic feeder reflect that the feeder has design defects, and problems such as the food leaking mechanism gets stuck and food leakage quantity is uncontrollable may occur. In addition, the following problems may also occur: the structural design is not good, a pet may acquire extra food through some actions and damage the feeder, the programming is complicated and manipulation is difficult.

The above problems are fatal, for example, the feeding mechanism gets stuck, the feeder stops feeding, and the pet may starve and even die if the master goes out for a long time.

A serious problem, for example, the feeding quantity is uncontrollable, may result in that the food intake of the pet is unstable or the pet starves for a long time, or the pet intakes too much food for a long time, to cause health problems, such as obesity, diabetes and malnutrition; or the pet may damage the feeder structure through actions to acquire extra food, thereby causing health problems and the like.

A slight problem, for example, the programming is complicated and illogical, may affect user experience.

Therefore, it is urgent in the field of current pet feeding utensils to provide an automatic feeder that can solve the fatal problems, ensure that the food leaking mechanism is stably operated and does not get stuck, ensure accurate food leaking quantity, prevent the pet from acquiring extra food, and is simple to operate.

SUMMARY

The present invention provides an automatic pet feeder with respect to the problem that food easily gets stuck in a current automatic pet feeder to cause ineffective feeding, where the feeder includes a food hopper and a feeding tray; the food hopper includes a cylindrical rotating shaft located in the center, and a big-end-down food leaking outer wall, where a grid is fixed between an outer side surface of the rotating shaft and the food leaking outer wall, and the grid is radial with the axis of the rotating shaft as the center of a circle, to partition a space between the outer side surface of the rotating shaft and the food leaking outer wall into feeding spaces with the same size, and further includes an annular food leaking plate whose inner diameter is the same as the radius of the rotating shaft and outer diameter is the same as the radius of a lower rim of the food leaking outer wall, where an inner rim and an outer rim of the food leaking plate expand upwards respectively to form an inner side limiting edge and an outer side limiting edge, and the food leaking plate is further provided with a sectorial food leaking hole; and the feeding tray consists of a chute and a food tray, and is provided thereon with a rotating shaft mounting slot corresponding to the rotating shaft of the food hopper.

Different feeding spaces are exposed in sequence through relative movement between the feeding spaces and the sectorial food leaking hole; here are two different manners, one is that the feeding spaces rotate, in this case, the sectorial food leaking hole is stationary, food falls down from the position of the fixed food leaking hole and slides down into the food tray along the chute, and reference can be made to the technical means in the prior art for the rotating manner thereof; the other one is that the feeding spaces are stationary while the sectorial food leaking hole is rotating, the sectorial food leaking hole is driven to rotate through rotation of the food leaking plate where the sectorial food leaking hole is, so as to expose the feeding spaces in sequence, the food falls down from different feeding spaces and slides down into the food tray along the chute, and similarly, reference can be made to the technical means of rotation in the prior art for the rotating manner.

Due to the two different rotating manners, different chutes can be configured; when the first manner is adopted, as the falling position is fixed, the chute can only be disposed below the food leaking hole; and when the second manner is adopted, as the falling position is a circle along the circumference, the chute needs to be set to a circle, so as to ensure that the food can be effectively guided into the food tray by the chute after falling down.

Further, it is disclosed that the outer side limiting edge of the food leaking plate is engaged with an inner side of the food leaking outer wall. That is to say, in the overall structure, the outer wall is a smooth surface, so as to prevent the pet from damaging the feeder.

Further, it is also disclosed that a bottom surface of the food leaking plate is fixed to form a recessed overall structure. That is to say, the food leaking plate is recessed entirely, so as to avoid that the pet damages the food leaking plate from a contact point between the food leaking plate at the bottom and a food leaking sidewall.

As another optional solution, it is also disclosed that a base is further included, where the base is an annular box with a cavity, whose inner diameter matches the outer diameter of the rotating shaft, and is mounted and fixed to a lower end of the rotating shaft, an opening on one side thereof is available for insertion of the feeding tray, and the food leaking plate matches the annular box, to close an upper top surface of the annular box.

In the structure, as the lower end of the whole food hopper is closed in the base, an outer side wall of the base and the food leaking outer wall of the food hopper form a smooth surface, so as to prevent the pet from damaging the food leaking plate during scratch. The food leaking plate serves as an upper cover of the base, and as the base is a cavity structure, the food enters the cavity of the base when leaking down from the food leaking hole of the food leaking plate, and slides down into the food tray through the chute of the feeding tray inserted therein.

On the basis of the structure with a base, it is further disclosed that positioning teeth are further included, where the positioning teeth are rotatably fixed to an upper rim of an inner circle of the base, a grid inner ring is added correspondingly, the grid is located between the grid inner ring and the food leaking outer wall, a non-grid fixing side of the grid inner ring projects to form positioning ridges, and the positioning ridges match the positioning teeth.

The positioning ridge is a plate-like structure with a certain thickness, and is fixed at a recess of adjacent positioning teeth, and in order to cooperate with the structure, a recess between two adjacent positioning teeth expands downwards to form a groove with a certain depth, so as to better fix the positioning ridge in the groove, thereby improving stability of the overall structure after fixing.

Meanwhile, as another preferred manner, a top cover is further provided, where the top cover matches an upper rim of the food leaking outer wall. The top cover may be one-piece and simultaneously covers the grid and the rotating shaft, and may also be formed by a combination of two parts, where an inner side circular cover covers the rotating shaft, and an outer side annular cover covers the grid.

Further, as one preferred manner, it is also disclosed that the food tray is internally provided with a partition ridge. The so-called partition ridge is a structural part projecting in the food tray, so as to partition the food tray into two relatively independent feeding spaces, thereby satisfying requirements of feeding two pets in a house.

After the technical solution disclosed by the present invention is adopted, food leakage of the automatic pet feeder has been observed for a long time and multiple times, but a problem that food blocks the food leaking hole has not been found.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The present invention is further described below with reference to the accompanying drawings and specific embodiments, and it should be understood that the following specific embodiments are only used for describing the present invention, but not intended to limit the scope of the present invention. It should be noted that the terms "front", "back", "left", "right", "up" and "down" in the following descriptions refer to directions in the drawings, and the terms "inner" and "outer" respectively refer to directions towards or away from the geometric center of a particular member.

Embodiment 1

Figure 1:
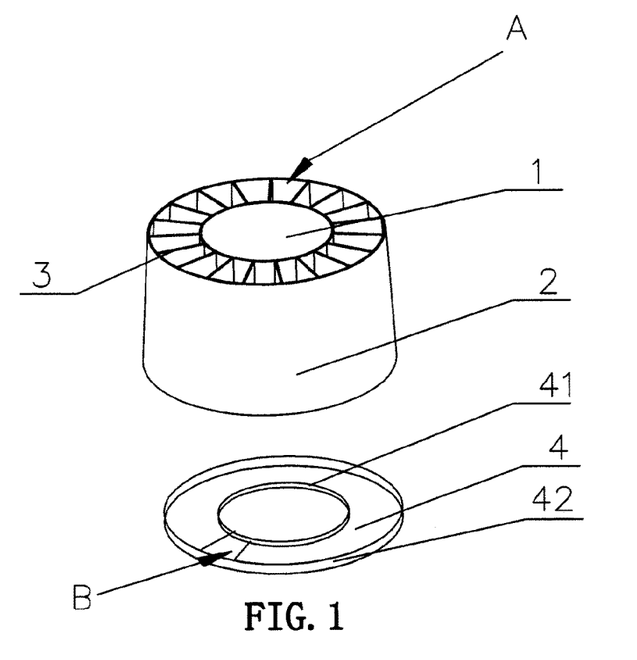
FIG. 1 is a schematic diagram of a food hopper in Embodiment 1.
Figure 2:
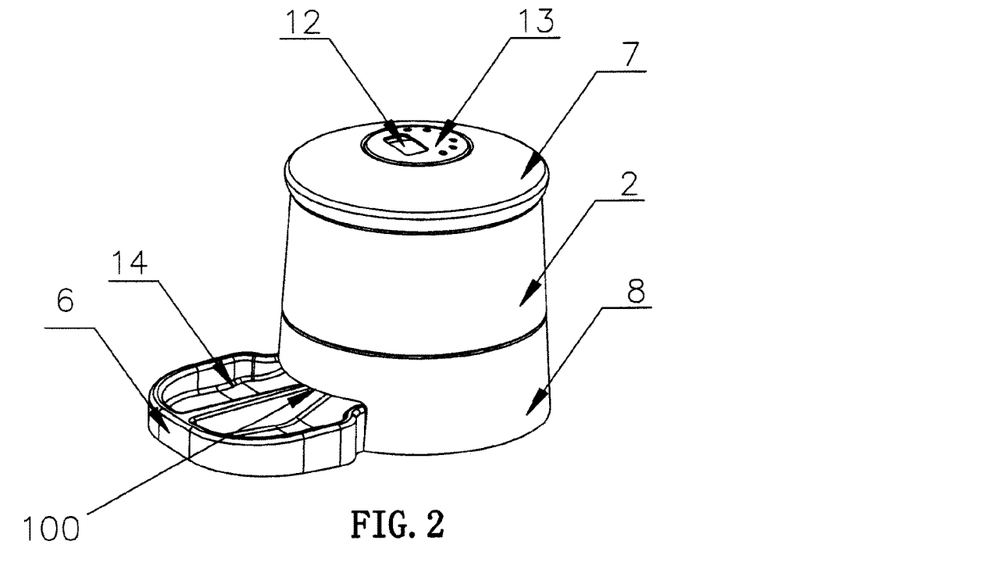
FIG. 2 is an overall schematic diagram of an automatic pet feeder.
Figure 3:
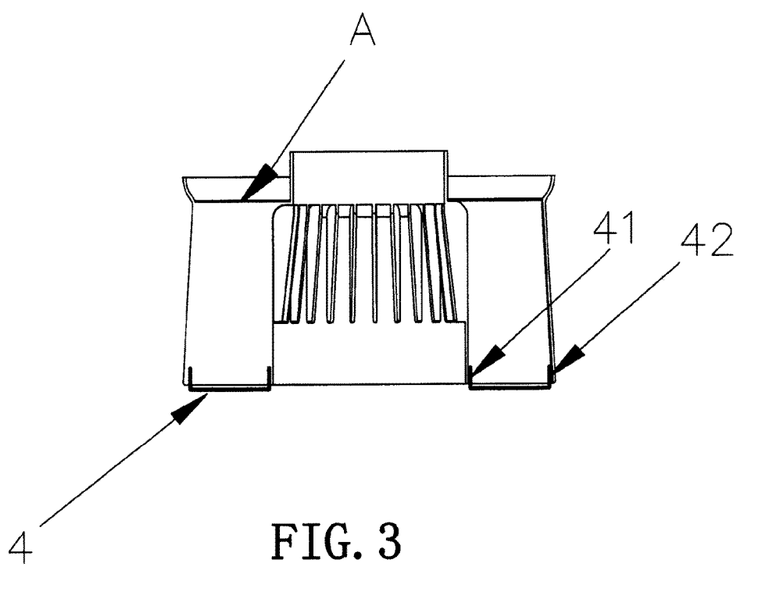
FIG. 3 is a longitudinal cross-sectional diagram of a food hopper of the automatic pet feeder.

FIG. 1, FIG. 2 and FIG. 3 show an automatic pet feeder, where the feeder includes a food hopper and a feeding tray; the food hopper includes a cylindrical rotating shaft 1 located in the center, and a big-end-down food leaking outer wall 2, where a grid 3 is fixed between an outer side surface of the rotating shaft and the food leaking outer wall, and the grid 3 is radial with the axis of the rotating shaft as the center of a circle, to partition a space between the outer side surface of the rotating shaft and the food leaking outer wall into feeding spaces (A in the figures) with the same size, from which it can be seen that, due to the structure of the food leaking outer wall 2, the feeding spaces A are also big-end-down conical spaces, as those shown in FIG. 3; and further includes an annular food leaking plate 4 whose inner diameter is the same as the radius of the rotating shaft and outer diameter is the same as the radius of a lower rim of the food leaking outer wall, where an inner rim and an outer rim of the food leaking plate 4 expand upwards respectively to form an inner side limiting edge 41 and an outer side limiting edge 42, and the food leaking plate 4 is further provided with a sectorial food leaking hole (part B in the figures). The feeding tray consists of a chute 5 and a food tray 6, and is provided thereon with a rotating shaft mounting slot 200 corresponding to the rotating shaft of the food hopper, so as to form the structure as described in FIG. 2. It can be seen that a control panel 13 with a liquid crystal display 12 is disposed on the top of the rotating shaft 1.

The cylindrical rotating shaft 1 and the grid 3 as well as the food leaking outer wall 2 are fixed together to form an overall structure, a motor structure disposed inside the cylindrical rotating shaft 1 drives the food hopper to rotate relative to the food leaking plate, reference can be made to the rotating technology in the prior art for this part, and leakage of food is implemented at the sectorial food leaking hole B, to achieve feeding effects.

Embodiment 2

Figure 4:
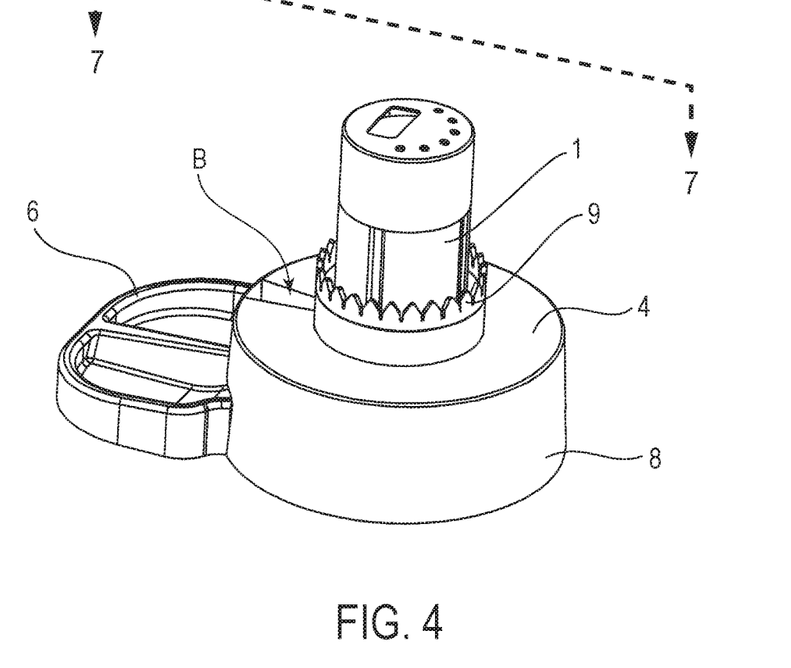
FIG. 4 is a schematic diagram of an automatic pet feeder (without a food hopper) in Embodiment 2.
Figure 5:
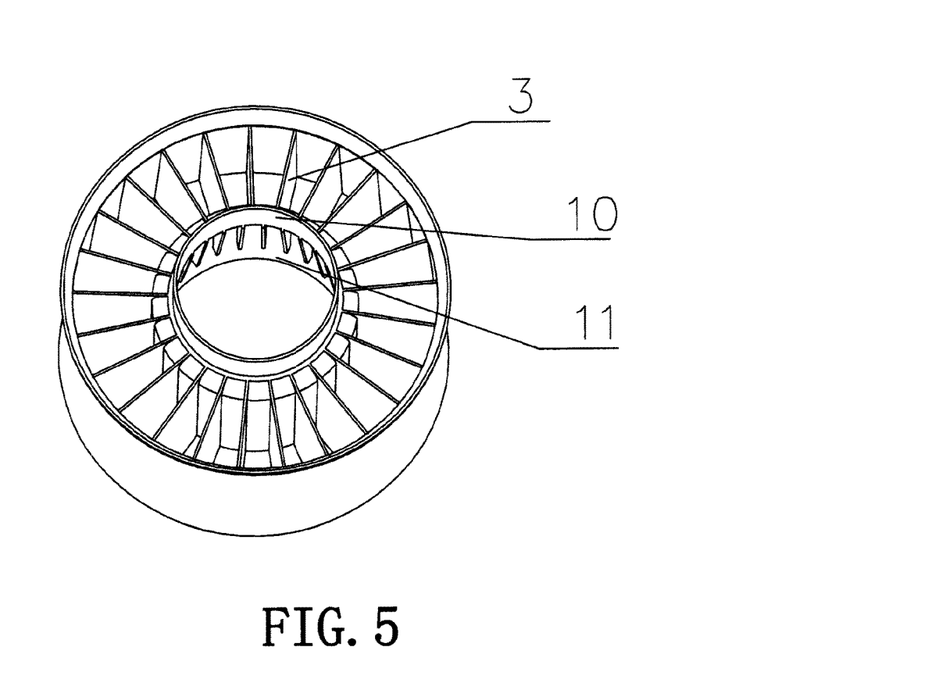
FIG. 5 is a schematic diagram of a food hopper in Embodiment 2.
Figure 7:
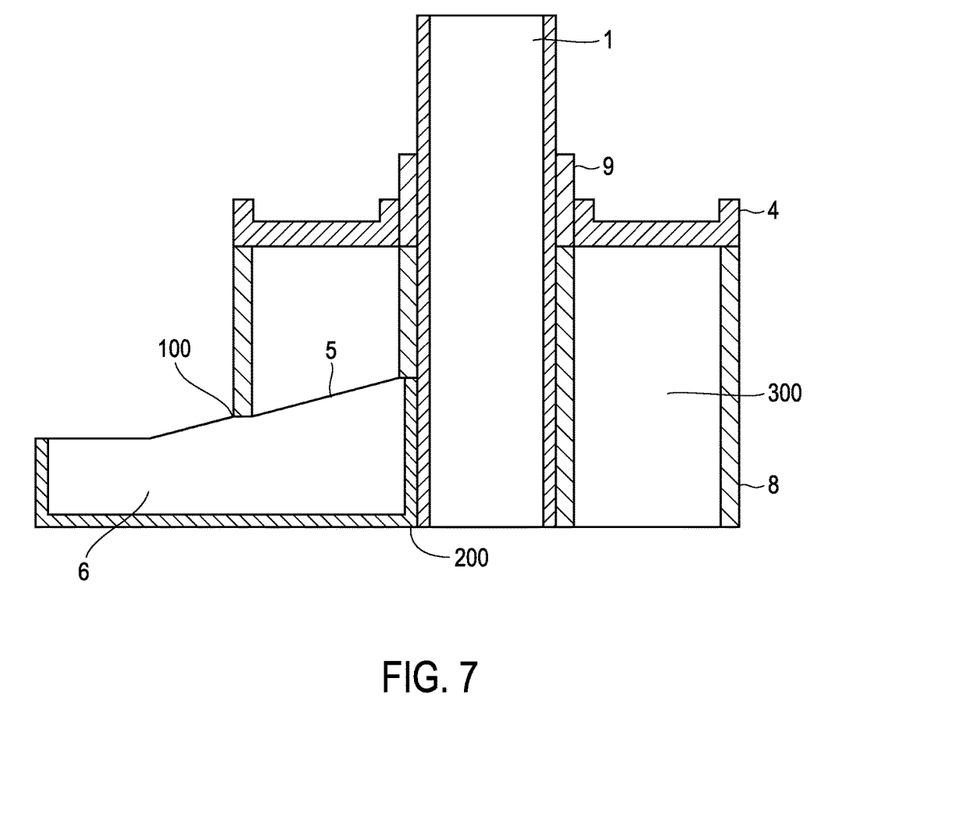
FIG. 7 is a schematic diagram of a cross-section along line 7-7 in FIG. 4.

On the basis of Embodiment 1, by paying special attention to FIG. 4, FIG. 5, and FIG. 7, a base 8 is further included, where the base is an annular box with a cavity 300, whose inner diameter matches the outer diameter of the rotating shaft 1, and is mounted and fixed to a lower end of the rotating shaft 1, an opening 100 on one side thereof is available for insertion of the feeding tray, and the food leaking plate 4 matches the annular box, to close an upper top surface of the annular box.

Figure 6:
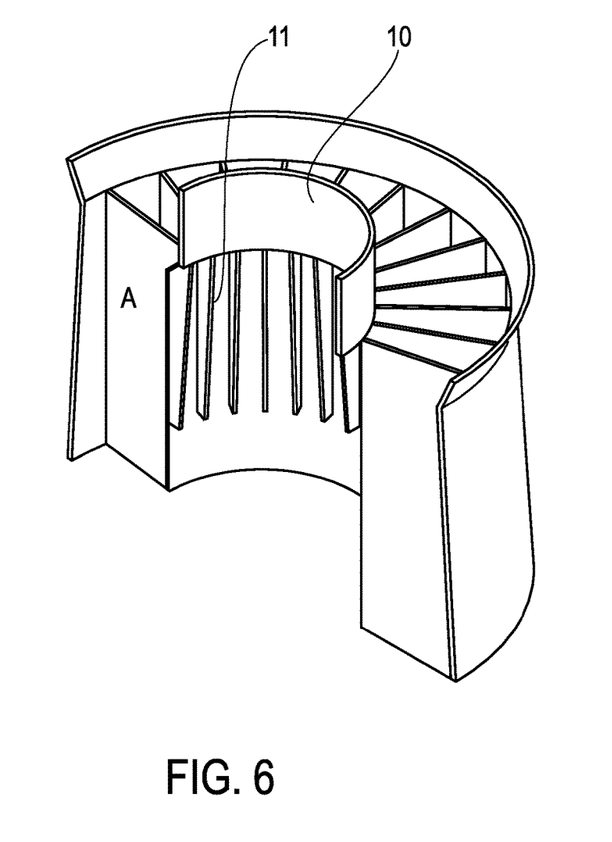
FIG. 6 is a schematic diagram of a cross-section of FIG. 5.

Preferably, on the basis of this structure, it is further disclosed in this embodiment that positioning teeth 9 are further included, where the positioning teeth 9 are rotatably fixed to an upper rim of an inner circle of the base 8, a grid inner ring 10 is added correspondingly, the grid 3 is located between the grid inner ring 10 and the food leaking outer wall 2, a non-grid fixing side of the grid inner ring 10 projects to form positioning ridges 11, and the positioning ridges 11 match the positioning teeth 9, as that shown in FIG. 6.

Embodiment 3

On the basis of Embodiment 1 or Embodiment 2, the area of the food leaking hole is greater than that of a sectorial cross-section of the feeding spaces.

Embodiment 4

On the basis of Embodiment 1, Embodiment 2 or Embodiment 3, a top cover 7 is further provided, where the top cover 7 matches an upper rim of the food leaking outer wall 2. Reference can be made to illustration in FIG. 2 for details.

Embodiment 5

As shown in FIG. 5, there are 25 feeding spaces, the master can put 24-day food therein at a time, but no food is put in the initial feeding space. Then, the motor rotates regularly, to leak food in a feeding space from the food leaking hole on each day, thereby achieving the purpose of feeding.

In order to determine effectiveness of the feeding, the motor is set to rotate once an hour, and if the phenomenon of blocking of the food leaking hole has not been found after the motor has continuously operated for 3 months, it indicates that the technical solution disclosed by the present invention can effectively solve the problems in the existing automatic pet feeder, thereby ensuring effectiveness of the feeding.

Embodiment 6

On the basis of Embodiments 1-5, it is further disclosed that a partition ridge 14 may be further provided, where the partition ridge 14 is disposed in the food tray 6, as that shown in FIG. 2, and can automatically partition the food into two parts, so as to facilitate simultaneous feeding of two pets.

The above descriptions are specific embodiments of the present invention, and it should be noted that persons of ordinary skill in the art, without departing from the principle of the present invention, can make several improvements and modifications which are considered to fall within the protection scope of the present invention.

What is claimed is:

1. An automatic pet feeder comprising:
   an annular food hopper that comprises:
      an outer wall having a top edge and a bottom edge;
      a cylindrical rotating shaft located along a central, vertical axis of the hopper;
      a grid fixed between an outer surface of the rotating shaft and an inner surface of the outer wall;
      wherein the grid extends radially with respect to the vertical axis and partitions a space between the outer surface of the rotating shaft and the inner surface of the outer wall into a plurality of equally sized feeding spaces;
      an annular food leaking plate, located below the feeding spaces, having an inner diameter approximately equal to an outer diameter of the rotating shaft and an outer diameter approximately equal to a diameter of the bottom edge of the outer wall;
      wherein an inner rim and an outer rim of the food leaking plate extend upwardly to respectively form an inner side limiting edge and an outer side limiting edge;
      wherein the food leaking plate is further provided with a sectorial food leaking hole; and
   a feeding tray that comprises:
      a chute located at least partially below the food leaking hole;
      a pet accessible food tray connected to the chute; and
      a rotating shaft mounting slot at the rear of the tray which corresponds to the outer surface of the rotating shaft.

2. The automatic pet feeder according to claim 1, wherein the outer side limiting edge of the food leaking plate is engaged with the inner surface of the outer wall.

3. The automatic pet feeder according to claim 2, wherein an area of the food leaking hole is greater than that of a sectorial cross-section of each feeding space.

4. The automatic pet feeder according to claim 1, further comprising:
   a base;
   wherein the base is an annular box with an interior space located between an inner and an outer wall;
   wherein the inner wall of the base has a diameter that corresponds to an outer diameter of the rotating shaft;
   wherein the rotating shaft is mounted to and fixed inside the inner wall of the base;
   wherein the food leaking plate connects to and covers an upper end of the box; and
   wherein the base comprises an opening through the outer wall thereof which permits the feeding tray to be inserted therethrough, such that the rotating shaft mounting slot abuts the rotating shaft.

5. The automatic pet feeder according to claim 4, further comprising:
   positioning teeth which surround the rotating shaft and are rotatably fixed to an upper portion of the base; and
   an inner ring which is sized to correspond to the outer surface of the rotating shaft and connected to the hopper or grid, comprising:
      positioning ridges;
      wherein the positioning ridges cooperate with the positioning teeth to rotate the feeding spaces of the hopper around the vertical axis and sequentially over the sectorial opening of the food leaking plate.

6. The automatic pet feeder according to claim 5, wherein an area of the food leaking hole is greater than that of a sectorial cross-section of each feeding space.

7. The automatic pet feeder according to claim 5, wherein the hopper, the grid, the inner ring, and the positioning ridges are formed as a unitary element.

8. The automatic pet feeder according to claim 4, wherein an area of the food leaking hole is greater than that of a sectorial cross-section of each feeding space.

9. The automatic pet feeder according to claim 1, wherein an area of the food leaking hole is greater than that of a sectorial cross-section of each feeding space.

10. The automatic pet feeder according to claim 1, further comprising a top cover, wherein the top cover connects to the top edge of the outer wall.

11. The automatic pet feeder according to claim 1, wherein the food tray is divided by an internal partition ridge.

12. The automatic pet feeder according to claim 1, wherein an area of the food leaking hole is greater than that of a sectorial cross-section of each feeding space.

13. The automatic pet feeder according to claim 1, wherein the bottom edge of the outer wall of the food hopper is wider than the top; and     wherein the outer wall is tapered from the top edge to the bottom edge.

\* \* \* \* \*